United States Patent
Nomura et al.

(10) Patent No.: US 10,538,138 B2
(45) Date of Patent: Jan. 21, 2020

(54) AIR CONDITIONING DEVICE FOR VEHICLE

(71) Applicant: DENSO CORPORATION, Kariya, Aichi-pref. (JP)

(72) Inventors: Tomoyuki Nomura, Kariya (JP); Mikiharu Kuwahara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 11 days.

(21) Appl. No.: 15/743,615

(22) PCT Filed: Jul. 22, 2016

(86) PCT No.: PCT/JP2016/071517
§ 371 (c)(1),
(2) Date: Jan. 10, 2018

(87) PCT Pub. No.: WO2017/022512
PCT Pub. Date: Feb. 9, 2017

(65) Prior Publication Data
US 2018/0201088 A1 Jul. 19, 2018

(30) Foreign Application Priority Data
Aug. 6, 2015 (JP) ................................ 2015-156200

(51) Int. Cl.
*B60H 1/00* (2006.01)
*F25B 47/02* (2006.01)
(Continued)

(52) U.S. Cl.
CPC ..... *B60H 1/00028* (2013.01); *B60H 1/00385* (2013.01); *B60H 1/00785* (2013.01);
(Continued)

(58) Field of Classification Search
CPC ....... F24F 11/86; F24F 11/42; B60H 1/00785; B60H 1/00921; B60H 1/00835;
(Continued)

(56) References Cited

U.S. PATENT DOCUMENTS 4,697,734 A * 10/1987 Ueda ................. B60H 1/00835
165/200
5,299,431 A * 4/1994 Iritani ................ B60H 1/00021
62/159
(Continued)

FOREIGN PATENT DOCUMENTS

JP 2001324237 A 11/2001
JP 2014058239 A 4/2014
(Continued)

*Primary Examiner* — Jianying C Atkisson
*Assistant Examiner* — Jose O Class-Quinones
(74) *Attorney, Agent, or Firm* — Harness, Dickey & Pierce, P.L.C.

(57) ABSTRACT

An air conditioning device has a blower, a compressor, a radiator, a decompressor, a heat absorber, and a controller. The compressor compresses and discharges a refrigerant. The radiator dissipates a heat of the refrigerant to the air thereby heating the air. The decompressor decompresses the refrigerant after the heat of the refrigerant is dissipated in the radiator. The refrigerant decompressed in the decompressor absorbs heat from outside air in the heat absorber. The controller determines whether the heat absorber is in a frosted state in which a frost is formed on the heat absorber or whether the heat absorber is in an estimated frosted state in which a frost is possibly formed on the heat absorber. The controller performs a frost delay control to delay a formation of the frost when the controller determines that the heat absorber is in the frosted state or the estimated frosted state.

10 Claims, 10 Drawing Sheets

(51) Int. Cl.
*F24F 11/89* (2018.01)
*F25B 6/04* (2006.01)
*B60H 1/32* (2006.01)
*F25B 9/00* (2006.01)

(52) U.S. Cl.
CPC ............... *F24F 11/89* (2018.01); *F25B 6/04* (2013.01); *F25B 47/02* (2013.01); *B60H 2001/3266* (2013.01); *F25B 9/002* (2013.01); *F25B 2400/0411* (2013.01)

(58) Field of Classification Search
CPC ............ F25B 47/02; F25B 47/022; F25B 2400/0409; F25B 2600/0253; F25B 2700/2106; F25B 2400/0411; F25B 2347/02; F25B 25/005; F25B 7/00; F25B 2339/047
See application file for complete search history.

(56) References Cited

U.S. PATENT DOCUMENTS

| | | | | |
|---|---|---|---|---|
| 5,309,731 A * | 5/1994 | Nonoyama | ........ | B60H 1/00849 62/244 |
| 5,598,887 A * | 2/1997 | Ikeda | ................. | B60H 1/00392 165/202 |
| 5,605,051 A * | 2/1997 | Iritani | .................. | B60H 1/3211 62/160 |
| 5,735,133 A * | 4/1998 | Voss | ........................ | B60H 1/005 62/185 |
| 6,047,770 A * | 4/2000 | Suzuki | ............... | B60H 1/00007 165/202 |
| 6,966,197 B2 * | 11/2005 | Itoh | .................... | B60H 1/00392 62/160 |
| 2002/0184908 A1 * | 12/2002 | Brotz | ....................... | B60H 1/00 62/259.2 |
| 2013/0291577 A1 * | 11/2013 | Miyakoshi | ......... | B60H 1/00392 62/151 |
| 2015/0246594 A1 | 9/2015 | Endoh et al. | | |
| 2016/0193896 A1 * | 7/2016 | Miyakoshi | ......... | B60H 1/00385 62/155 |

FOREIGN PATENT DOCUMENTS

| | | | |
|---|---|---|---|
| JP | 2014061854 A | 4/2014 | |
| JP | 2014088152 A | 5/2014 | |
| JP | 2014159266 A | 9/2014 | |
| WO | WO-2015025907 A1 * | 2/2015 | ......... B60H 1/00385 |

* cited by examiner

FIG. 8

```
OUTSIDE VEHICLE COMPARTMENT: -10°C(80%) 2.5m/s(INITIAL)
INSIDE VEHICLE COMPARTMENT: -10°C
Nc: 8600rpm(MAX)
INTERIOR CONDENSER OUTLET SC: 10°C
```

FIG. 9

| OPERATION MODE | TOTAL VOLUME OF AIR | OPENING DEGREE OF AIR MIX DOOR | VOLUME OF AIR PASSING THROUGH INTERIOR CONDENSER | VOLUME OF AIR BYPASSING INTERIOR CONDENSER |
|---|---|---|---|---|
| NORMAL HEATING MODE | 250m³/h | 100% | 250m³/h | 0m³/h |
| FROST FORMATION DELAY MODE | ↑ | 68% | 170m³/h | 80m³/h |

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2016/071517 filed on Jul. 22, 2016 and published in Japanese as WO 2017/022512 A1 on Feb. 9, 2017. This application is based on and claims the benefit of priority from Japanese Patent Application No. 2015-156200 filed on Aug. 6, 2015. The entire disclosures of all of the above applications are incorporated herein by reference.

TECHNICAL FIELD

The present disclosure relates to an air conditioning device for a vehicle.

BACKGROUND ART

Conventionally, an air conditioning device for a vehicle heats an inside of a vehicle compartment by using a heat pump cycle. In such an air conditioning device for a vehicle, condensed water on an exterior heat exchanger freezes to form frost when a temperature of refrigerant flowing through the exterior heat exchanger falls below a dew-point temperature. If the frost is formed on the exterior heat exchanger, an amount of heat absorbed from outside air in the exterior heat exchanger reduces, which significantly degrades heating performance.

Patent Literature 1 discloses an air conditioning device for a vehicle in which an opening degree of an expansion valve is increased to increase a temperature of refrigerant in an exterior heat exchanger to thereby delay frost formation in the exterior heat exchanger when the frost formation is likely to occur in the exterior heat exchanger.

PRIOR ART LITERATURES

Patent Literature

Patent Literature 1: JP 2014-159266 A

SUMMARY OF INVENTION

Normally, an opening degree of an expansion valve is adjusted so as to obtain an optimum coefficient of performance COP of a heat pump cycle. Specifically, the opening degree of the expansion valve is adjusted so that a subcooling degree of refrigerant flowing out of a condenser becomes a target subcooling degree.

In the above-described conventional art, however, the opening degree of the expansion valve is increased to delay the frost formation on the exterior heat exchanger when the frost formation is likely to occur on the exterior heat exchanger. As a result, the subcooling degree of refrigerant flowing out of a condenser deviates from the target subcooling degree, which degrades a coefficient of performance COP of a heat pump cycle.

The present disclosure addresses the above-described issues, and it is an objective of the present disclosure to provide an air conditioning device for a vehicle in which frost formation on a heat absorber can be delayed with a minimum change of operation of a pressure reducer.

According to the present disclosure, an air conditioning device for a vehicle has a blower, a compressor, a radiator, a decompressor, a heat absorber, and a controller. The blower blows air toward an inside of a vehicle compartment. The compressor compresses and discharges a refrigerant. The radiator dissipates a heat of the refrigerant, which is discharged from the compressor, to the air thereby heating the air. The decompressor decompresses the refrigerant after the heat of the refrigerant is dissipated in the radiator. The refrigerant decompressed in the decompressor absorbs heat from outside air in the heat absorber. The controller determines whether the heat absorber is in a frosted state in which a frost is formed on the heat absorber or whether the heat absorber is in an estimated frosted state in which a frost is possibly formed on the heat absorber. The controller performs a frost delay control, in which the controller increases a pressure of the refrigerant on a high-pressure side, thereby delaying a formation of the frost when the controller determines that the heat absorber is in the frosted state or the estimated frosted state.

With this configuration, as shown in an example in FIG. 6, when the controller performs the frost delay control, a refrigerant pressure on a high-pressure side increases and therefore a difference in enthalpy between the refrigerant at an outlet and the refrigerant at an inlet of the heat absorber reduces. As a result, an amount of heat absorbed by the heat absorber reduces, which delays the frost formation on the heat absorber.

BRIEF DESCRIPTION OF DRAWINGS

The above and other objects, features and advantages of the present disclosure will become more apparent from the following detailed description made with reference to the accompanying drawings.

FIG. 8 is a table showing operating conditions in operation examples in FIG. 7.

FIG. 9 is a table showing controlled states of various devices in the operation examples in FIG. 7.

DESCRIPTION OF EMBODIMENTS

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
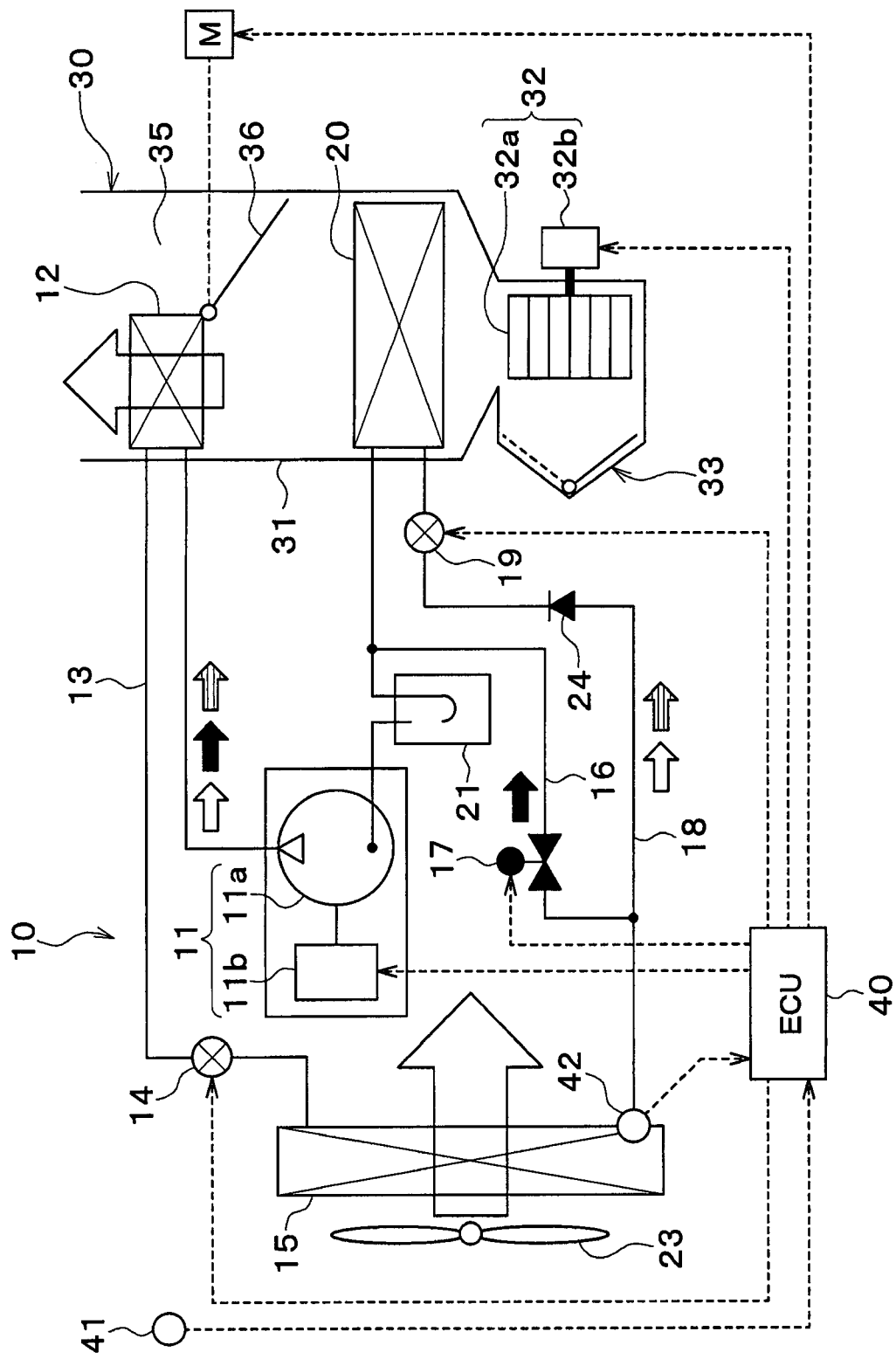
FIG. 1 is a diagram illustrating a whole configuration of an air conditioning device for a vehicle according to a first embodiment.

An air conditioning device 1 for a vehicle shown in FIG. 1 is an air conditioning device that air conditions an inside of a vehicle compartment. The air conditioning device 1 for the vehicle is mounted to a hybrid vehicle. The hybrid vehicle is a vehicle that obtains drive force for traveling of the vehicle from an engine and an electric motor for traveling.

The air conditioning device 1 for the vehicle has a refrigeration cycle device 10. The refrigeration cycle device 10 cools or heats air to be blown into the vehicle compartment.

The refrigeration cycle device 10 can switch between a refrigerant flow path for a cooling mode, a refrigeration flow path for a dehumidification heating mode, and a refrigeration flow path for a heating mode.

In the cooling mode, a cooling operation for cooling the inside of the vehicle compartment is performed. In the dehumidification heating mode, a dehumidification heating operation for heating while dehumidifying the inside of the vehicle compartment is performed. In the heating mode, a heating operation for heating the inside of the vehicle compartment is performed.

A refrigerant used in the refrigeration cycle device 10 is a fluorocarbon refrigerant. The refrigeration cycle device 10 configures a subcritical refrigeration cycle in which a pressure of high-pressure refrigerant does not exceed a critical pressure. Refrigerant oil that lubricates a compressor 11 is mixed into the refrigerant. Part of the refrigerant oil circulates through the cycle with the refrigerant.

The compressor 11 is disposed in a vehicle engine room. The compressor 11 draws, compresses, and discharges the refrigerant in the refrigeration cycle device 10. The compressor 11 is an electric compressor. The compressor 11 has a compression mechanism 11a and an electric motor 11b.

The compression mechanism 11a is a fixed capacity type compressor with a fixed discharge capacity. The electric motor 11b is a drive portion that drives the compression mechanism 11a. For example, the compression mechanism 11a is a scroll compression mechanism and a vane compression mechanism.

A rotational speed of the electric motor 11b is controlled based on a control signal output from a controller 40. The electric motor 11b is an AC motor or a DC motor. Refrigerant discharge performance of the compression mechanism 11a is changed by controlling the rotational speed of the electric motor 11b. The electric motor 11b is a discharge performance changing unit of the compression mechanism 11a.

An inlet of an interior condenser 12 is connected to a discharge port of the compressor 11. The interior condenser 12 is disposed in a case 31 of an interior air conditioning unit 30. The interior condenser 12 is a radiator that dissipates a heat of the high-pressure refrigerant discharged from the compressor 11. The interior condenser 12 is a heating heat exchanger that heats air passing through an interior evaporator 20.

A first refrigerant passage 13 is connected to an outlet of the interior condenser 12. The first refrigerant passage 13 is a passage that guides the refrigerant flowing out of the interior condenser 12 to an exterior heat exchanger 15. A first expansion valve 14 is disposed in the first refrigerant passage 13. The first expansion valve 14 is a first throttle unit that can change a passage area of the first refrigerant passage 13.

The first expansion valve 14 is a decompressor that decompresses the refrigerant performed heat exchange in the interior condenser 12. The first expansion valve 14 is an electric variable throttle mechanism having a valve element and an electric actuator. A throttle opening degree of the valve element is variable. The electric actuator is a stepping motor that changes the throttle opening degree of the valve element.

The first expansion valve 14 is a variable throttle mechanism with a fully opening function. The first expansion valve 14 fully opens the first refrigerant passage 13 when the throttle opening degree of the first expansion valve 14 is fully open. The first expansion valve 14 does not exert a pressure reducing effect on the refrigerant by fully opening the first refrigerant passage 13. Operation of the first expansion valve 14 is controlled based on a control signal output from the controller 40.

An inlet of the exterior heat exchanger 15 is connected to an outlet of the first expansion valve 14. The exterior heat exchanger 15 is a refrigerant-outside air heat exchanger that performs heat exchange between the refrigerant and outside air. The refrigerant flows through the exterior heat exchanger 15. The outside air is air outside the vehicle compartment. The outside air is blown into the exterior heat exchanger 15 from a blower fan 23.

The exterior heat exchanger 15 functions as an evaporator that evaporates the refrigerant in the heating mode and the like. The exterior heat exchanger 15 functions as a heat absorber that causes the refrigerant decompressed in the first expansion valve 14 to absorb heat from the outside air in the heating mode and the like. The exterior heat exchanger 15 functions as a condenser that condenses the refrigerant in the cooling mode and the like. The exterior heat exchanger 15 serves as a radiator that dissipates a heat of the refrigerant in the cooling mode and the like.

A second refrigerant passage 16 and a third refrigerant passage 18 are connected to an outlet of the exterior heat exchanger 15. The second refrigerant passage 16 guides the refrigerant flowing out of the exterior heat exchanger 15 to a suction side of the compressor 11 via an accumulator 21. The third refrigerant passage 18 guides the refrigerant flowing out of the exterior heat exchanger 15 to the suction side of the compressor 11 via a second expansion valve 19, the interior evaporator 20, and the accumulator 21.

The second refrigerant passage 16 is a parallel refrigerant passage in which the refrigerant flows in parallel to the second expansion valve 19. A first opening/closing valve 17 is disposed in the second refrigerant passage 16. The first opening/closing valve 17 is an opening/closing unit that opens and closes the second refrigerant passage 16. The first opening/closing valve 17 is a solenoid valve. Operation of the first opening/closing valve 17 is controlled based on a control signal output from the controller 40.

When the first opening/closing valve 17 is open, a pressure loss produced when the refrigerant passes through the second refrigerant passage 16 is smaller than a pressure loss produced when the refrigerant passes through the third refrigerant passage 18. This is because a check valve 24 and the second expansion valve 19 are disposed in the third refrigerant passage 18.

Therefore, the refrigerant flowing out of the exterior heat exchanger 15 flows into the second refrigerant passage 16 when the first opening/closing valve 17 is open and the refrigerant flowing out of the exterior heat exchanger 15 flows into the third refrigerant passage 18 when the first opening/closing valve 17 is closed.

The first opening/closing valve 17 switches a cycle configuration by opening and closing the second refrigerant passage 16. The first opening/closing valve 17 switches the flow path of the refrigerant circulating through the cycle by opening and closing the second refrigerant passage 16. The first opening/closing valve 17 configures a refrigerant flow path switching unit that switches the flow path of the refrigerant.

The second expansion valve 19 is disposed in the third refrigerant passage 18. The second expansion valve 19 is a decompressor that decompresses the refrigerant. The second expansion valve is a second throttle unit that is configured to be able to change a passage area of the third refrigerant passage 18.

The second expansion valve 19 is an electric variable throttle mechanism having a valve element and an electric actuator. A throttle opening degree of the valve element is variable. The electric actuator is a stepping motor that changes the throttle opening degree of the valve element.

The second expansion valve 19 is a variable throttle mechanism with a fully opening function. The second expansion valve 19 fully opens the third refrigerant passage 18 when the throttle opening degree of the second expansion valve 19 is fully open. The second expansion valve 19 does not exert a pressure reducing effect on the refrigerant by fully opening the third refrigerant passage 18. Operation of the second expansion valve 19 is controlled by control signals output from the controller 40.

An inlet of the interior evaporator 20 is connected to an outlet of the second expansion valve 19. The interior evaporator 20 is disposed on an upstream side of the interior condenser 12 in an air flow direction in the case 31 of the interior air conditioning unit 30.

The interior evaporator 20 is an evaporator that evaporates the refrigerant by performing heat exchange between the refrigerant and the air before passing through the interior condenser 12. The interior evaporator 20 is a heat absorbing heat exchanger that cools the air by a heat absorbing effect.

An inlet of the accumulator 21 is connected to a refrigerant outlet of the interior evaporator 20. The accumulator 21 is a gas-liquid separator that separates the refrigerant flowing out of the interior evaporator 20 into a gas-phase refrigerant and a liquid-phase refrigerant and accumulates excess refrigerant in the refrigeration cycle device 10.

A suction port of the compressor 11 is connected to a gas-phase refrigerant outlet of the accumulator 21. The accumulator 21 suppresses drawing of the liquid-phase refrigerant into the compressor 11 and prevents liquid compression in the compressor 11.

The check valve 24 is disposed in the third refrigerant passage 18 between the outlet of the exterior heat exchanger 15 and the second expansion valve 19. The check valve 24 is a backflow preventing unit that prevents backflow of the refrigerant.

The check valve 24 permits a flow of refrigerant from the outlet of the exterior heat exchanger 15 toward an inlet of the second expansion valve 19, and prohibits a flow of refrigerant from the inlet of the second expansion valve 19 toward the outlet of the exterior heat exchanger 15. The check valve 24 prevents the refrigerant guided from the second refrigerant passage 16 toward the accumulator 21 from flowing toward the exterior heat exchanger 15 in the third refrigerant passage 18.

The interior air conditioning unit 30 is disposed inside an instrument panel at a most front portion in the vehicle compartment. The case 31 forms an outer shell of the interior air conditioning unit 30. The case 31 houses therein a blower 32, the interior condenser 12, the interior evaporator 20, and the like.

The case 31 forms an air passage. The case 31 is formed by using resin having a certain degree of elasticity and excellent in strength. For example, the case 31 is formed by using polypropylene.

An inside/outside air switching device 33 is disposed on a most upstream side in the case 31 in the air flow direction. The inside/outside air switching device 33 switches between and introduces inside air and the outside air. The inside air is air in the vehicle compartment.

An inside air introducing port and an outside air introducing port are formed at the inside/outside air switching device 33. The inside air introducing port introduces the inside air into the case 31. The outside air introducing port introduces the outside air into the case 31. An inside/outside air switching door is disposed in the inside/outside air switching device 33. The inside/outside air switching door continuously adjusts opening areas of the inside air introducing port and the outside air introducing port to thereby change a ratio between an air volume of the inside air and an air volume of the outside air.

The blower 32 is disposed on a downstream side of the inside/outside air switching device 33 in the air flow direction. The blower 32 blows the air introduced through the inside/outside air switching device 33 toward the inside of the vehicle compartment. The blower 32 is an electric blower that has a centrifugal multi-blade fan 32a and an electric motor 32b.

The centrifugal multi-blade fan 32a is a blower that blows the air into the vehicle compartment. The centrifugal multi-blade fan 32a is a sirocco fan. The electric motor 32b drives the centrifugal multi-blade fan 32a. A rotational speed of the electric motor 32b is controlled by a control voltage output from the controller 40. A blown air volume of the blower 32 is controlled by the controller 40.

The interior evaporator 20 and the interior condenser 12 are disposed in this order along the air flow direction on a downstream side of the blower 32 in the air flow direction. The interior evaporator 20 is disposed on an upstream side of the interior condenser 12 in the air flow direction.

The case 31 has a cold air bypass passage 35 formed therein. The cold air bypass passage 35 is a passage that allows the air passed through the interior evaporator 20 to detour around the interior condenser 12.

An air mix door 36 is disposed on a downstream side of the interior evaporator 20 in the air flow direction and on the upstream side of the interior condenser 12 in the air flow direction. The air mix door 36 is an air volume ratio adjuster that adjusts a ratio between a volume of air passing through the interior condenser 12 and a volume of air passing through the cold air bypass passage 35 out of the air passed through interior evaporator 20. The air mix door 36 adjusts the ratio between the volume of air heated in the interior condenser 12 and the volume of the rest of air out of the blown air volume from the blower 32.

A mixing space is provided on a downstream side of the interior condenser 12 in the air flow direction and on a downstream side of the cold air bypass passage 35 in the air flow direction. The mixing space is a space in which the air passing through the interior condenser 12 and the air passing through the cold air bypass passage 35 are mixed.

Blow outlets are disposed on a most downstream side in the case 31 in the air flow direction. The blow outlets blow conditioned air obtained by mixing in the mixing space toward the inside of the vehicle compartment. The blow outlets are a face blow outlet, a foot blow outlet, and a defroster blow outlet. The face blow outlet blows the conditioned air toward an upper body of an occupant in the vehicle compartment. The foot blow outlet blows the conditioned air toward feet of the occupant. The defroster blow outlet blows the conditioned air toward an inner face of a vehicle windshield.

The air mix door 36 adjusts the ratio between the volume of air passing through the interior condenser 12 and the volume of air passing through the cold air bypass passage 35 to thereby adjust a temperature of the conditioned air obtained by mixing in the mixing space to adjust a temperature of the conditioned air blown from each of the blow outlets.

The air mix door 36 is driven by a servomotor 37. Operation of the servomotor 37 is controlled based on a control signal output from the controller 40. The controller 40 controls the operation of the servomotor 37 to thereby adjust an opening degree of the air mix door 36 in a range of 0% to 100%.

When the opening degree of the air mix door 36 is adjusted to 0%, a maximum cooling state is obtained. In other words, if the opening degree of the air mix door 36 is adjusted to 0%, the air mix door 36 fully opens the cold air bypass passage 35 and fully closes the air passage in the interior condenser 12. When the opening degree of the air mix door 36 is adjusted to 100%, a maximum heating state is obtained. In other words, when the opening degree of the air mix door 36 is adjusted to 100%, the air mix door 36 fully closes the cold air bypass passage 35 and fully opens the air passage in the interior condenser 12.

A face door, a foot door, and a defroster door are respectively disposed on upstream sides of the face blow outlet, the foot blow outlet, and the defroster blow outlet in the air flow direction. The face door adjusts an opening area of the face blow outlet. The foot door adjusts an opening area of the foot blow outlet. The defroster door adjusts an opening area of the defroster blow outlet.

The face door, the foot door, and the defroster doors are blow outlet mode switching units that switch a mode among blow outlet modes. A servomotor operates the face door, the foot door, and the defroster doors, for example, through a link mechanism. Operation of the servomotor is controlled based on a control signal output from the controller 40.

The controller 40 is configured by a known microcomputer that has a CPU, a ROM, RAM, and the like and peripheral circuits of the microcomputer. The controller 40 performs various computations and processing based on control programs stored in the ROM and controls operations of various control target devices connected to an output side.

A group of sensors for air conditioning control is connected to an input side of the controller 40. The group of sensors has an inside air sensor, an outside air sensor 41, an insolation sensor, an evaporator temperature sensor, a discharge temperature sensor, a high-pressure pressure sensor, and an outlet refrigerant temperature sensor 42.

The inside air sensor detects a vehicle compartment temperature Tr. The outside air sensor 41 detects an outside air temperature Tam. The insolation sensor detects an insolation amount Ts in the vehicle compartment. The evaporator temperature sensor is an evaporator blowing temperature detector that detects a blown air temperature (evaporator temperature) Te from the interior evaporator 20. The discharge temperature sensor detects a temperature Td of the refrigerant discharged from the compressor 11. The high-pressure pressure sensor detects a refrigerant pressure Ph of the interior condenser 12. The outlet refrigerant temperature sensor 42 detects a temperature of the refrigerant at the outlet of the exterior heat exchanger 15.

Operation signals from various operation switches are input to the controller 40. The various operation switches are provided to an operation panel. The operation panel is disposed near the instrument panel at the front portion in the vehicle compartment.

The various operation switches are an air conditioning switch, a temperature setting switch, and the like. The air conditioning switch is an operation switch that sets whether the interior air conditioning unit 30 performs cooling of the air. The temperature setting switch is an operation switch that sets a set temperature in the vehicle compartment.

The controller 40 includes control sections. The control sections control various target devices connected to an output side of the controller 40. Specifically, each of the control sections of the controller 40 is configured by software and hardware and controls an operation of a corresponding one of the control target devices.

For example, the software and hardware that control the electric motor of the compressor 11 configure the discharge performance controller. The software and hardware that control the first expansion valve 14 configure the first throttle controller. The software and hardware that control the second expansion valve 19 configure the second throttle controller. The software and hardware that control the first opening/closing valve 17 configure the flow path switching controller. The software and hardware that control the servomotor 37 for driving the air mix door 36 configure the air mix door controller.

Next, operation of the air conditioning device 1 for the vehicle of the present embodiment having the above-described configuration will be described. In the air conditioning device 1 for the vehicle of the present embodiment, as described above, it is possible to switch a mode among the cooling mode in which the inside of the vehicle compartment is cooled, the heating mode in which the inside of the vehicle compartment is heated, and the dehumidification heating mode in which the inside of the vehicle compartment is heated while being dehumidified.

Figure 2:
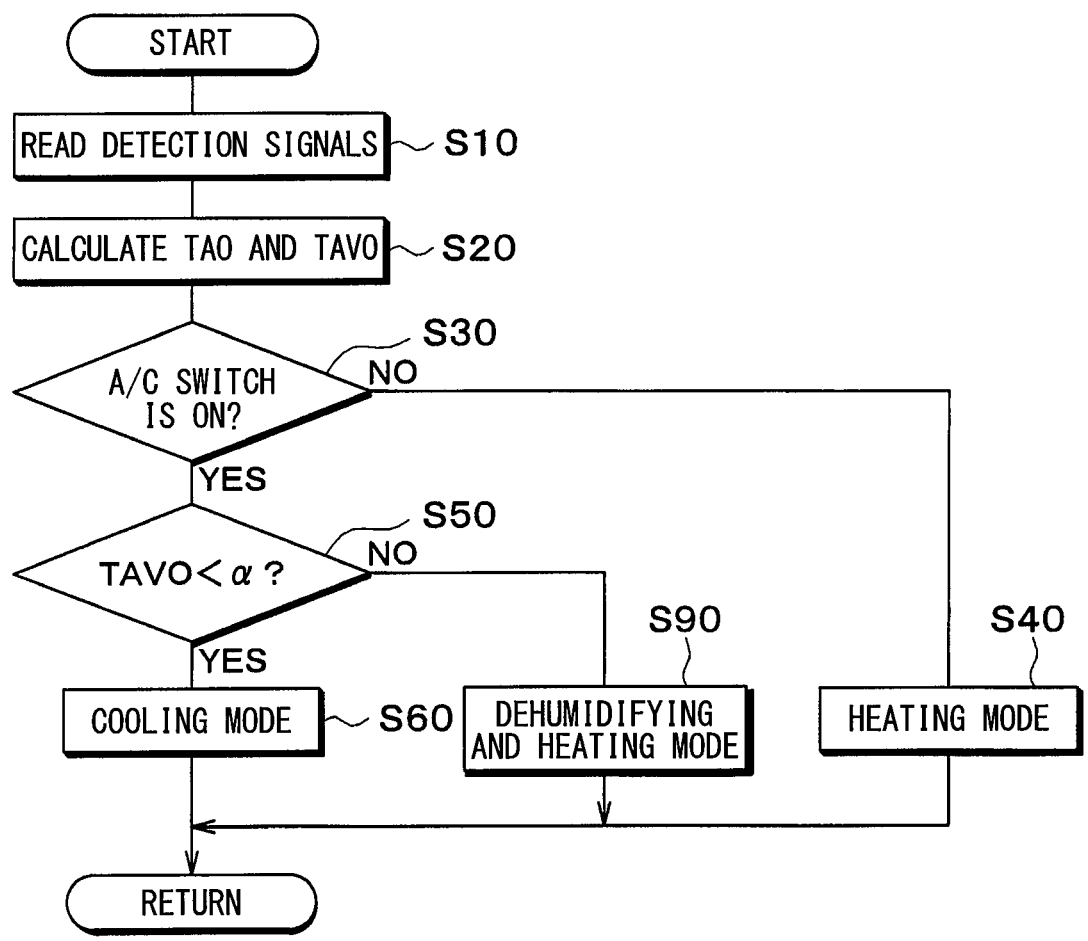
FIG. 2 is a flowchart illustrating a flow of control processing performed by a controller of the air conditioning device for the vehicle according to the first embodiment.

Switching control processing among the operation modes will be described based on FIG. 2. FIG. 2 is a flowchart illustrating a flow of control processing performed by the controller 40 of the air conditioning device 1 for the vehicle of the present embodiment. The flowchart in FIG. 2 is performed as a subroutine subordinate to a main routine for the air conditioning control. The control sections shown in FIG. 2 configure various function implementing sections included in the controller 40.

In S10, the controller 40 reads in detection signals from the above-described group of sensors and the operation signals from the operation panel. In S20, based on the read-in detection signals and operation signals, a target blowing temperature TAO is calculated by a following expression F1. The target blowing temperature TAO is a target temperature of blown air blown into the vehicle compartment. According to the present embodiment, the control section of S20 configures a target blowing temperature determination section.

$$TAO = Kse \times Tset - Kr \times Tr - Kam \times Tam - Ks \times Ts + C \quad (F1)$$

Tset is a set temperature in the vehicle compartment set by the temperature setting switch. Tr is a temperature in the vehicle compartment (inside air temperature) detected by the inside air sensor. Tam is an outside air temperature detected by the outside air sensor 41. Ts is an insolation amount detected by the insolation sensor. Kset, Kr, Kam, and Ks are control gains and C is a constant for correction.

In S20, the controller 40 sets the target blowing temperature TAVO of the interior condenser 12 based on the target blowing temperature TAO and with reference to a control map stored in advance.

In S30, it is determined whether the air conditioning switch on the operation panel is in an ON state. When it is determined that the air conditioning switch is in an OFF state, the controller 40 proceeds to S40 to set the operation mode to the heating mode. When it is determined that the air conditioning switch is in the ON state, the controller 40 proceeds to S50.

In S50, it is determined whether the target condenser blowing temperature TAVO is lower than a cooling reference temperature α. The cooling reference temperature α is determined in advance and stored in the controller 40. When it is determined that the target condenser blowing temperature TAVO is lower than the cooling reference temperature α, the controller 40 proceeds to S60 to set the operation mode to the cooling mode. When it is determined that the target condenser blowing temperature TAVO is equal to or higher than the cooling reference temperature α, the controller 40 proceeds to S90 to set the operation mode to the dehumidification heating mode.

In this manner, it is possible to properly switch the operation mode among the heating mode, the cooling mode, and the dehumidification heating mode according to an operation environment of the air conditioning device 1 for the vehicle.

Next, operations in the heating mode, the cooling mode, and the humidification heating mode will be described.

(A) Heating Mode

In the heating mode, the controller 40 opens the second refrigerant passage 16 by using the first opening/closing valve 17. In this way, the refrigerant flow path in the refrigeration cycle device 10 switches to such a refrigerant flow path in which the refrigerant flows as shown by black arrows in FIG. 1.

With the above-described configuration of the refrigerant flow path, the controller 40 sets operation states of the various control target devices connected to the controller 40 based on the target blowing temperature TAO, the target condenser blowing temperature TAVO, and the detection signals from the group of sensors. The operation states are, in other words, the control signals output to the various control target devices.

Figure 3:
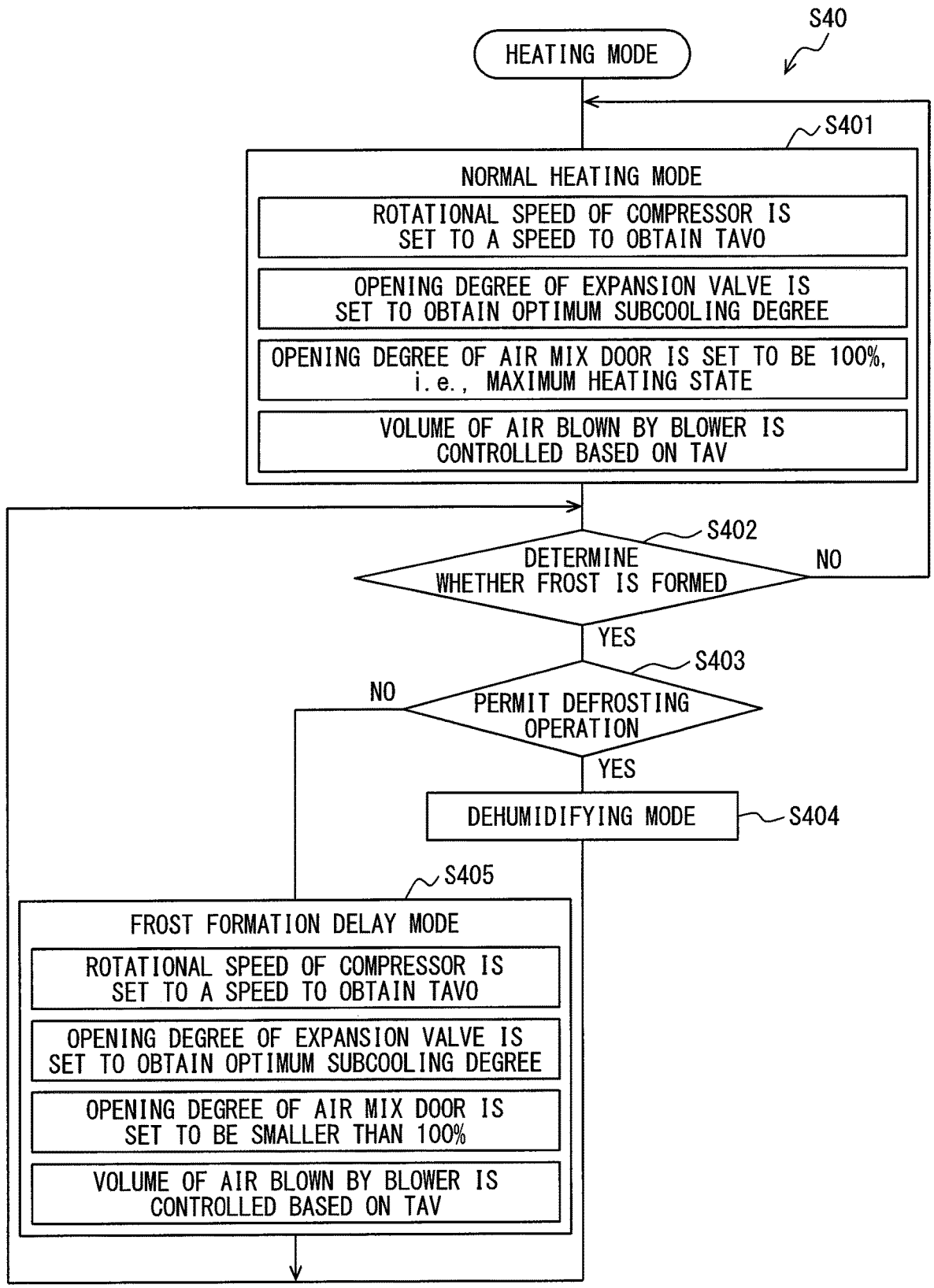
FIG. 3 is a flowchart illustrating a part of the control processing of the air conditioning device for the vehicle according to the first embodiment.
Figure 4:
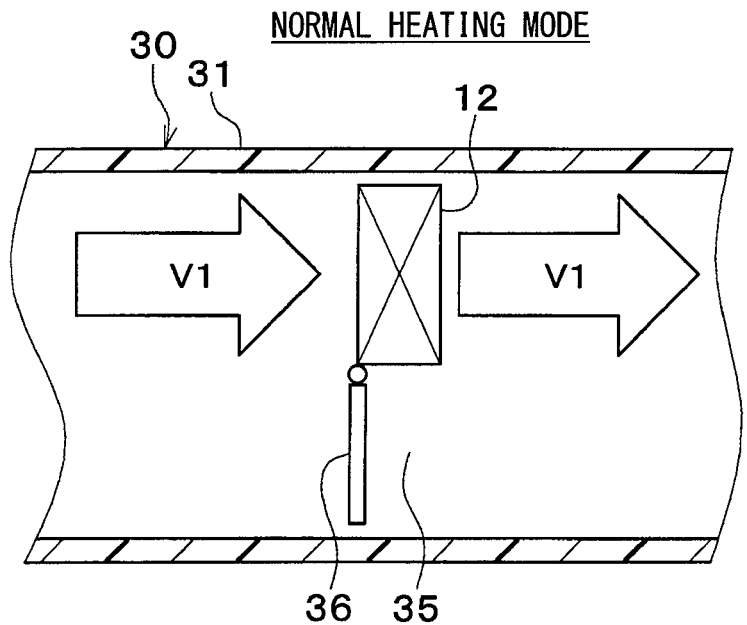
FIG. 4 is a schematic diagram illustrating an operation state of an interior air conditioning unit in a normal heating mode in the air conditioning device for the vehicle according to the first embodiment.

Processing for determining the operation states of the various control target devices, i.e., the control signals output to the respective control target devices in the heating mode will be described based on a flowchart in FIG. 3.

In S401, the controller 40 sets the operation states of the various control target devices in the normal heating mode, i.e., the control signals output to the respective control target devices in the normal heating mode.

The rotational speed of the compressor 11, i.e., the control signal output to the electric motor 11b of the compressor 11, is set as follows. First, based on a deviation between the target condenser blowing temperature TAVO and a condenser blown-air temperature TAV and by use of a feedback control method, the control signal output to the electric motor 11b of the compressor 11 is set so that the temperature of the blown air blown into the vehicle compartment approaches the target blowing temperature TAO. In this way, the rotational speed of the compressor 11, i.e., the refrigerant discharge performance of the compressor 11 is set.

The opening degree of the first expansion valve 14, i.e., the control signal output to the first expansion valve 14 is set so that a subcooling degree of the refrigerant flowing into the first expansion valve 14 approaches a target subcooling degree. The target subcooling degree is set in advance so that a coefficient of performance COP of the cycle approaches a maximum value.

The opening degree of the air mix door 36, i.e., the control signal output to the servomotor of the air mix door 36, is set so that the air mix door 36 closes the cold air bypass passage 35 and that an entire volume of the air passed though the interior evaporator 20 passes through the air passage in the interior condenser 12. In other words, in the normal heating mode, the opening degree of the air mix door 36 is set to 100% to bring the air mix door 36 into a position for the maximum heating state.

The air volume blown by the blower 32, i.e., the control signal output to the electric motor 32b of the blower 32, is set based on the condenser blown-air temperature TAV.

Next, in step S402, frost formation determination is performed. For example, based on the outside air temperature Tam detected by the outside air sensor 41 and an outlet-side refrigerant temperature of the exterior heat exchanger 15 detected by the outlet refrigerant temperature sensor 42, it is determined whether the exterior heat exchanger 15 is in a frosted state or whether the exterior heat exchanger 15 is estimated to be in the frosted state. The frosted state is a state in which a specified amount of frost formation is occurring in the exterior heat exchanger 15. The estimated frosted state is a state in which the frost formation is expected to occur in the exterior heat exchanger 15.

When it is determined that the exterior heat exchanger 15 is in the frosted state or the estimated frosted state, the controller 40 proceeds to S403 to determine whether the refrigeration cycle device 10 is in a defrosting permitted state. The defrosting permitted state is a state in which a defrosting operation mode is permitted. The defrosting operation mode is an operation mode in which high-temperature high-pressure refrigerant flows into the exterior heat exchanger 15 to melt the frost. It is determined that the refrigeration cycle device 10 is not in the defrosting permitted state when the vehicle is traveling, for example.

When it is determined that the refrigeration cycle device 10 is in the defrosting permitted state, the controller 40 proceeds to S404 to set the defrosting operation mode. When it is determined that the refrigeration cycle device 10 is not in the defrosting permitted state, the controller 40 proceeds to S405 to set the operation states of the various control target devices, i.e., the control signals output to the various control target devices in a frost formation delaying mode.

The rotational speed of the compressor 11, i.e., the control signal output to the electric motor 11b of the compressor 11, is set in the same way as in the normal heating mode in S401. In other words, based on a deviation between the target condenser blowing temperature TAVO and the condenser blown-air temperature TAV and by use of the feedback control method, the control signal output to the electric motor 11b of the compressor 11 is set so that the temperature of the blown air blown into the vehicle compartment approaches the target blowing temperature TAO. In this way, the rotational speed of the compressor 11, i.e., the refrigerant discharge performance of the compressor 11 is set.

The opening degree of the first expansion valve 14, i.e., the control signal output to the first expansion valve 14, is set in the same way as in the normal heating mode in S401 so that the subcooling degree of the refrigerant flowing into the first expansion valve 14 approaches the target degree of subcooling. The target subcooling degree is set in advance so that the coefficient of performance (COP) of the cycle approaches the maximum value.

Figure 5:
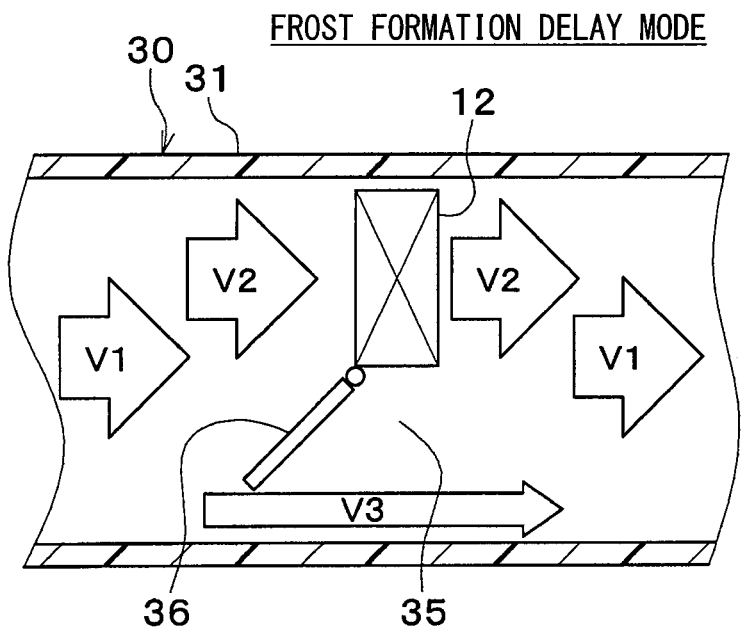
FIG. 5 is a schematic diagram illustrating an operation state of an interior air conditioning unit in a frost formation delaying mode in the air conditioning device for the vehicle according to the first embodiment.

As shown in FIG. 5, the opening degree of the air mix door 36, i.e., the control signal output to the servomotor of the air mix door 36, is set so that the air mix door 36 opens the cold air bypass passage 35 to a specified degree and that the air passed though the interior evaporator 20 divides into the air passage in the interior condenser 12 and the cold air bypass passage 35.

In other words, in the frost formation delaying mode, the opening degree of the air mix door 36 is set to be smaller than 100% to avoid the maximum heating state. In other words, in the frost formation delaying mode, the opening degree of the air mix door 36 is smaller than in the normal heating mode.

The air volume blown by the blower 32, i.e., the control signal output to the electric motor 32b of the blower 32, is set based on the condenser blown-air temperature TAV in the same way as in the normal heating mode in S401.

Then, the control signals and the like set as described above are output to the various control target devices. After that, the control routines are repeated until a stop of operation of the air conditioning device 1 for the vehicle is requested by use of the operation panel. The control routines has the processing for determining the operation mode at each specified period, determination of the operation states of the various control target devices, and output of the control signals, and the like. The control routines are repeated similarly in the other operation modes.

Therefore, in the refrigeration cycle device 10 in the heating mode, the high-pressure refrigerant discharged from the compressor 11 flows into the interior condenser 12. The refrigerant flowing into the interior condenser 12 performs heat exchange with the air blown from the blower 32 and passed through the interior evaporator 20 to dissipate heat. In this way, the air to be blown into the vehicle compartment is heated.

The refrigerant flowing out of the interior condenser 12 flows into the first expansion valve 14 through the first refrigerant passage 13, and then the refrigerant is decompressed and expanded until the refrigerant becomes low-pressure refrigerant in the first expansion valve 14. The low-pressure refrigerant decompressed by the first expansion valve 14 flows into the exterior heat exchanger 15 and absorbs heat from the outside air blown by the blower fan. The refrigerant flowing out of the exterior heat exchanger 15 flows into the accumulator 21 through the second refrigerant passage 16 and is separated into a gas-phase refrigerant and a liquid-phase refrigerant.

The gas-phase refrigerant separated in the accumulator 21 is drawn from the suction side of the compressor 11 and compressed again in the compressor 11. The liquid-phase refrigerant separated in the accumulator 21 is stored in the accumulator 21 as excess refrigerant not necessary for exerting refrigeration performance required of the cycle. The third refrigerant passage 18 is closed by the second expansion valve 19, and thus the refrigerant does not flow into the interior evaporator 20.

As described above, in the heating mode, the interior condenser 12 can dissipate heat of the high-pressure refrigerant discharged from the compressor 11 into the air to thereby blow the heated air into the vehicle compartment. In this way, it is possible to perform heating in the vehicle compartment.

The air mix door 36 is opened to a smaller degree in the frost formation delaying mode than in the normal heating mode. As a result, the smaller volume of air passes through the interior condenser 12 than in the normal heating mode, which increases refrigerant pressure on a high-pressure side of the refrigeration cycle.

Figure 6:
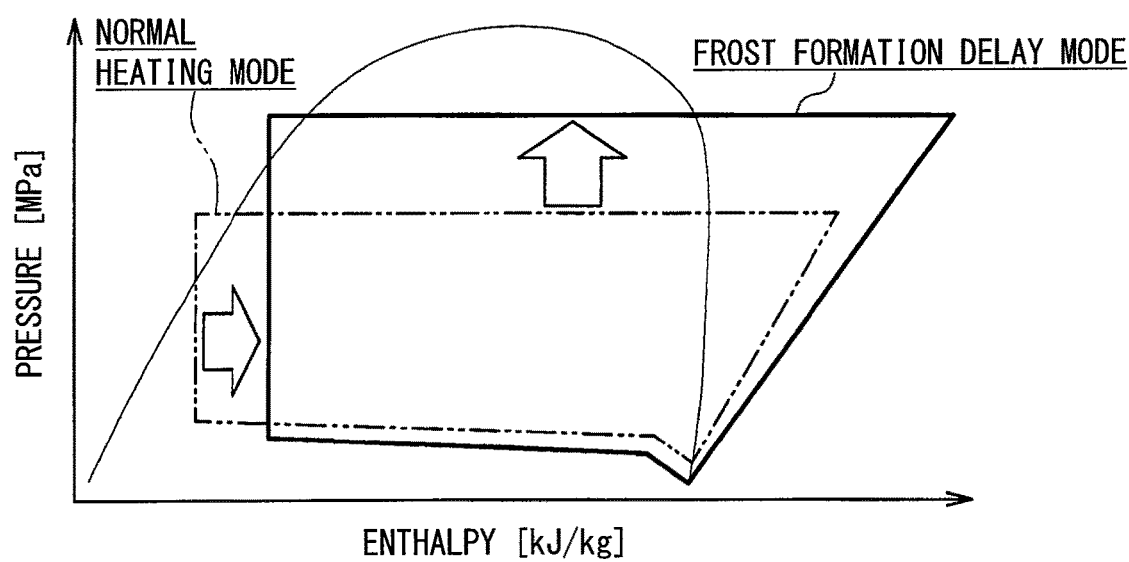
FIG. 6 is a Mollier diagram illustrating states of refrigerant in the frost formation delaying mode and the normal heating mode in the air conditioning device for the vehicle according to the first embodiment.

As shown in a Mollier diagram in FIG. 6, in the frost formation delaying mode, a difference between an enthalpy at the inlet of the exterior heat exchanger 15 and an enthalpy at the outlet of the exterior heat exchanger 15 reduces by an amount corresponding to an increase in the refrigerant pressure on the high-pressure side of the refrigeration cycle as compared with that in the normal heating mode. Therefore, an amount of heat absorption by the exterior heat exchanger 15 reduces, which reduces an amount of frost formation on the exterior heat exchanger 15.

Figure 7:
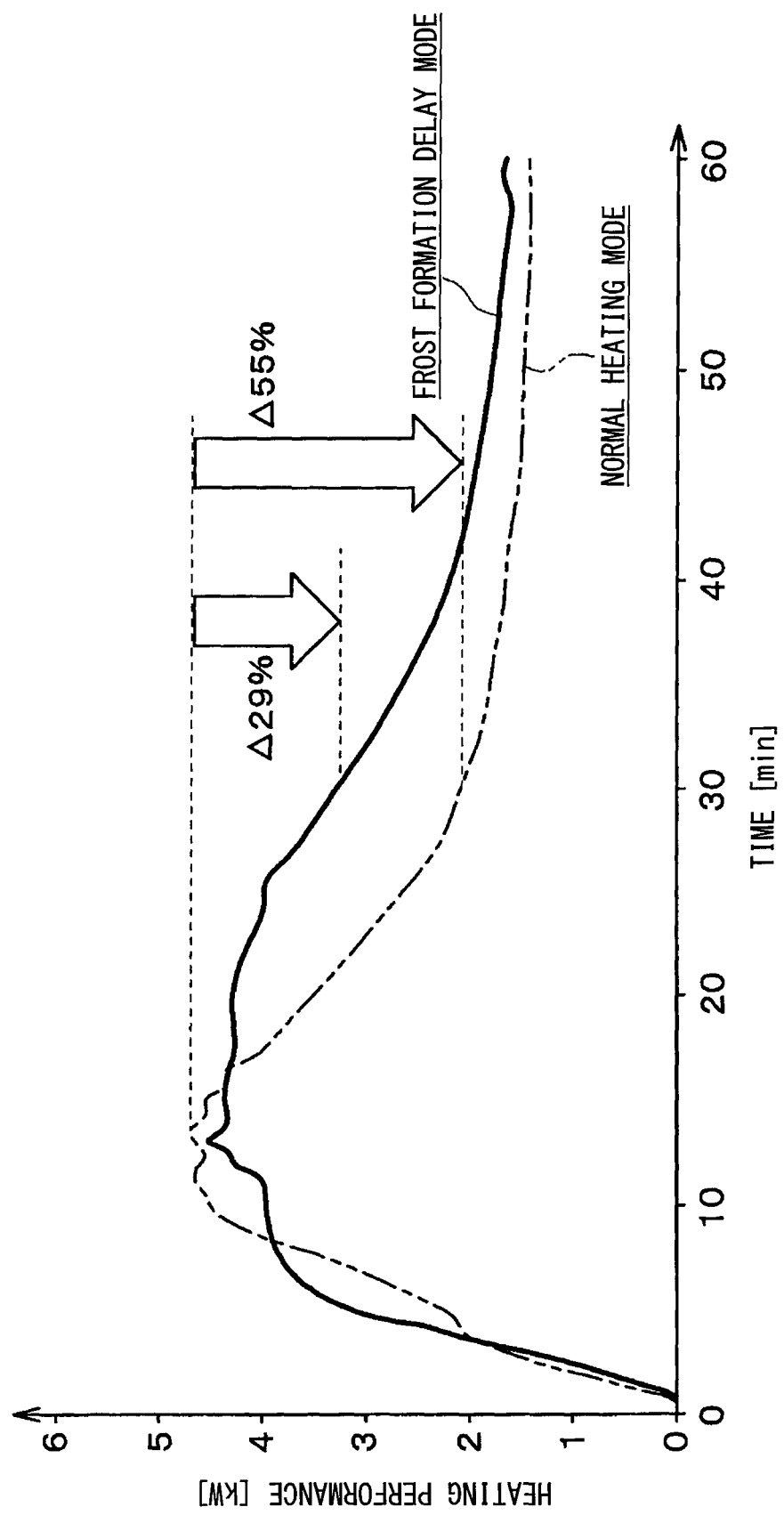
FIG. 7 is a graph illustrating examples of transitions of heating performance in the frost formation delaying mode and the normal heating mode in the air conditioning device for the vehicle according to the first embodiment.

As a result, it is possible to delay the frost formation on the exterior heat exchanger 15. Therefore, in the frost formation delaying mode, it is possible to suppress reduction in the heating performance more successfully than in the normal heating mode. In operation examples shown in FIG. 7, while heating performance reduces by 55% from maximum heating performance after a lapse of 30 minutes in the normal heating mode, the heating performance reduces by only 29% from maximum heating performance after a lapse of 30 minutes in the frost formation delaying mode. FIGS. 8 and 9 show operating conditions and controlled states of the various devices in the operation examples in FIG. 7.

In the frost formation delaying mode, an entire blown air volume of the blower 32 is the same as that in the normal heating mode. Therefore, it is possible to maintain the same volume of blown air blown into the vehicle compartment as in the normal heating mode.

In the frost formation delaying mode, the rotational speed of the compressor 11 is higher than in the normal heating mode. Therefore, it is possible to maintain the blown air blown into the vehicle compartment at the same temperature as in the normal heating mode.

In the frost formation delaying mode, the opening degree of the first expansion valve 14 is controlled so that the subcooling degree of the refrigerant flowing into the first expansion valve 14 approaches the target subcooling degree. Therefore, it is possible to bring the coefficient of performance (COP) of the cycle close to the maximum value.

When the operation mode is set to the defrosting mode, the refrigeration cycle device 10 switches to the flow path for the cooling mode. In this way, the high-temperature high-pressure refrigerant can flow into the exterior heat exchanger 15, thereby melting the frost.

(B) Cooling Mode

In the cooling mode, the controller 40 closes the second refrigerant passage 16 by use of the first opening/closing valve 17. Moreover, the controller 40 fully opens the first refrigerant passage 13 by use of the first expansion valve 14. As a result, the refrigerant flow path in the refrigeration cycle device 10 is switched to the flow path in which the refrigerant flows as shown by white arrows in FIG. 1.

With the above-described configuration of the refrigerant flow path, the controller 40 sets the operation states of the various control target devices connected to the controller 40, i.e., the control signals output to the various control target devices based on the target blowing temperature TAO, the detection signals from the group of sensors, and the like.

For example, the refrigerant discharge performance of the compressor 11, i.e., the control signal output to the electric motor 11b of the compressor 11 is set as follows. First, based on the target blowing temperature TAO and with reference to the control map stored in advance in the controller 40, a target evaporator blowing temperature TEO of the air blown out of the interior evaporator 20 is set. Therefore, a target evaporator blowing temperature determination section is configured by a control section that sets the target evaporator blowing temperature TEO. The control section is included in a control routine performed by the controller 40.

Then, based on a deviation of the target evaporator blowing temperature TEO and a detection value of the evaporator temperature sensor from each other and by use of a feedback control method, the control signal output to the electric motor 11b of the compressor 11 is set so that the temperature of the air passing through the interior evaporator 20 approaches the target blowing temperature TAO.

The control signal output to the second expansion valve 19 is set so that the subcooling degree of the refrigerant flowing into the second expansion valve 19 approaches the target subcooling degree. The target subcooling degree is set in advance so that the COP approaches the maximum value.

The control signal output to the servomotor of the air mix door 36 is set so that the air mix door 36 closes the air passage in the interior condenser 12 and that the entire volume of the air after passing though the interior evaporator 20 passes through the cold air bypass passage 35.

Therefore, in the refrigeration cycle device 10 in the cooling mode, the high-pressure refrigerant discharged from the compressor 11 flows into the interior condenser 12. At this time, since the air mix door 36 closes the air passage in the interior condenser 12, the refrigerant flowing into the interior condenser 12 flows out of the interior condenser 12 substantially without exchanging heat with the air.

The refrigerant flowing out of the interior condenser 12 flows into the first expansion valve 14 through the first refrigerant passage 13. At this time, since the first expansion valve 14 fully opens the first refrigerant passage 13, the refrigerant flowing out of the interior condenser 12 flows into the exterior heat exchanger 15 without being decompressed by the first expansion valve 14. Then, the refrigerant flowing out of the exterior heat exchanger 15 dissipates heat into the outside air blown by the blower fan in the exterior heat exchanger 15.

The refrigerant flowing out of the exterior heat exchanger 15 flows into the second expansion valve 19 through the third refrigerant passage 18 and is decompressed and expanded by the second expansion valve 19 until the refrigerant becomes the low-pressure refrigerant. The low-pressure refrigerant decompressed by the second expansion valve 19 flows into the interior evaporator 20 and absorbs heat from the air blown from the blower 32 to evaporate. In this way, the air to be blown into the vehicle compartment is cooled.

The refrigerant flowing out of the interior evaporator 20 flows into the accumulator 21 and is separated into gas and liquid. Then, the gas-phase refrigerant separated in the accumulator 21 is drawn from the suction side of the compressor 11 and compressed again in the compressor 11. The liquid-phase refrigerant separated in the accumulator 21 is stored in the accumulator 21 as the excess refrigerant not necessary for exerting refrigeration performance required of the cycle.

As described above, in the cooling mode, since the air passage in the interior condenser 12 is closed by the air mix door 36, it is possible to blow the air cooled in the interior evaporator 20 into the vehicle compartment. In this way, it is possible to perform cooling in the vehicle compartment.

(C) Dehumidification Heating Mode

In the dehumidification heating mode, the controller 40 closes the second refrigerant passage 16 by use of the first opening/closing valve 17. Then, each of the first expansion valve 14 and the second expansion valve 19 are brought into the throttling state or the fully open state. In this way, the refrigeration cycle device 10 switches to the refrigerant flow path in which the refrigerant flows as shown by horizontal-striped white arrows in FIG. 1 in the same way as in the cooling mode. In the dehumidification heating mode, the exterior heat exchanger 15 and the interior evaporator 20 are connected in series with respect to the refrigerant flow.

With the above-described configuration of the refrigerant flow path, the controller 40 sets the operation states of the various control target devices connected to the controller 40, i.e., the control signals output to the various control target devices based on the target blowing temperature TAO, the target condenser blowing temperature TAVO, the detection signals from the group of sensors, and the like.

For example, the control signal output to the electric motor 11b of the compressor 11 is set in the same way as in the cooling mode. The control signal output to the servomotor of the air mix door 36 is set so that the air mix door 36 closes the cold air bypass passage 35 and that the entire volume of the air after passing though the interior evaporator 20 passes through the air passage in the interior condenser 12.

A throttle opening degree of each of the first expansion valve 14 and the second expansion valve 19 is changed according to the target condenser blowing temperature TAVO computed based on the target blowing temperature TAO which is the target temperature of the blown air blown into the vehicle compartment. Specifically, the controller 40 reduces the passage area of the first refrigerant passage 13 by use of the first expansion valve 14 and increases the passage area of the third refrigerant passage 18 by use of the second expansion valve 19 as the target condenser blowing temperature TAVO increases. In this way, in the dehumidification heating mode, four-stage modes from a first mode to a fourth mode are performed continuously.

In the first mode, the first refrigerant passage 13 is brought into the fully open state by use of the first expansion valve 14 and the second expansion valve 19 is brought into the throttling state. In other words, while the refrigerant flow path in the cycle configuration is exactly the same as in the cooling mode, the air mix door 36 fully opens the air passage in the interior condenser 12.

In this way, the high-pressure refrigerant discharged from the compressor 11 performs heat exchange with the air cooled and dehumidified in the interior evaporator 20 to thereby dissipate heat. As a result, the air blown into the vehicle compartment is heated.

Therefore, in the first mode of the dehumidification heating mode, the air cooled and dehumidified in the interior evaporator 20 can be heated in the interior condenser 12 and blown into the vehicle compartment. In this way, it is possible to perform the dehumidification heating in the vehicle compartment.

In the second mode, the first expansion valve 14 is brought into the throttling state and the second expansion valve 19 is brought into the throttling state with greater throttle opening than in the first mode. Therefore, in the second mode, it is possible to reduce the temperature of the refrigerant flowing into the exterior heat exchanger 15 to a lower temperature than in the first mode. Therefore, it is possible to reduce a difference between the temperature of the refrigerant in the exterior heat exchanger 15 and the outside air temperature to thereby reduce an amount of heat dissipated by the refrigerant in the exterior heat exchanger 15.

As a result, it is possible to increase the amount of heat dissipated by the refrigerant in the interior condenser 12 to a greater amount than in the first mode to thereby increase the temperature of the blown air blown out of the interior condenser 12.

In the third mode, the first expansion valve 14 is brought into the throttling state with smaller throttle opening than in the second mode and the second expansion valve 19 is brought into the throttling state with greater throttle opening than in the second mode.

Therefore, in the third mode, the refrigerant flowing out of the interior condenser 12 flows into the first expansion valve 14 through the first refrigerant passage 13 and is decompressed until the refrigerant becomes intermediate-pressure refrigerant at a lower temperature than the outside air temperature. Then, the intermediate-pressure refrigerant decompressed in the first expansion valve 14 flows into the exterior heat exchanger 15 and absorbs heat from the outside air blown from the blower fan.

In other words, in the third mode, the exterior heat exchanger 15 functions as the heat absorber in which the refrigerant absorbs heat by reducing the throttle opening degree of the first expansion valve 14. Therefore, it is possible to increase the temperature of the air blown out of the interior condenser 12 to a higher temperature than in the second mode.

As a result, it is possible to increase the amount of heat dissipated by the refrigerant in the interior condenser 12 to a greater amount than in the second mode to thereby increase the temperature of the blown air blown out of the interior condenser 12.

In the fourth mode, the first expansion valve 14 is brought into the throttling state with smaller throttle opening than in the third mode and the third refrigerant passage 18 is brought into the fully open sate by use of the second expansion valve 19.

Therefore, in the fourth mode, it is possible to reduce a refrigerant evaporating temperature in the exterior heat exchanger 15 to a lower temperature than in the third mode to thereby increase the amount of heat absorbed by the refrigerant in the exterior heat exchanger 15.

As a result, it is possible to increase the temperature of the blown air blown out of the interior condenser 12 to a higher temperature than in the third mode.

In this manner, in the dehumidification heating mode, it is possible to adjust the temperature of the blown air blown into the vehicle compartment in a wide range from a low temperature range to a high temperature range by changing the throttle opening degree of each of the first expansion valve 14 and the second expansion valve 19 according to the target condenser blowing temperature TAVO computed based on the target blowing temperature TAO.

In other words, in the dehumidification heating mode, it is possible to adjust the amount of heat dissipated or absorbed by the refrigerant in the exterior heat exchanger 15 while switching the exterior heat exchanger 15 from the state in which the exterior heat exchanger 15 serves as the radiator that dissipates heat of the refrigerant to the state in which the exterior heat exchanger 15 serves as the evaporator in which the refrigerant absorbs heat.

Therefore, it is possible to adjust the amount of heat dissipated by the refrigerant in the interior condenser 12 in a wide range to thereby widen a range of temperature adjustment of the blown air blown into the space to be air conditioned during the dehumidification operation.

In the present embodiment, as described in S402 and S405, the controller 40 determines whether the exterior heat exchanger 15 is in the frosted state in which the frost formation is occurring or the estimated frosted state in which the frost formation is expected. When it is determined that the exterior heat exchanger 15 is in the frosted state or the estimated frosted state, the controller 40 performs a frost delay control for increasing the refrigerant pressure on the high-pressure side in order to delay the frost formation.

In this way, as shown in FIG. 6, when the controller 40 performs the frost delay control, the refrigerant pressure on the high-pressure side increases, which reduces a difference in enthalpy between the refrigerant at the outlet of the exterior heat exchanger 15 and the refrigerant at the inlet of the exterior heat exchanger 15. As a result, the amount of heat absorbed in the exterior heat exchanger 15 reduces and therefore it is possible to delay the frost formation on the exterior heat exchanger 15.

In the present embodiment, as described in S405, the controller 40 controls the operation of the air mix door 36 so that the volume of the air heated in the interior condenser 12 reduces under the frost delay control.

In this way, it is possible to increase the refrigerant pressure on the high-pressure side by reducing the volume of the air heated in the interior condenser 12 under the frost delay control. At this time, since the volume of the air heated by the interior condenser 12 is reduced by use of the air mix door 36, it is possible to maintain the volume of the air blown into the vehicle compartment. Therefore, it is possible to delay the frost formation on the exterior heat exchanger 15 while maintaining as much comfort of the occupant by the air conditioning as possible.

In the present embodiment, as described in S405, the controller 40 increases the rotational speed of the compressor 11 to a specified rotational speed that is set relative to the target blowing temperature TAO under the frost delay control.

In this way, it is possible to suppress reduction of the target blowing temperature TAO even when the amount of heat absorbed in the exterior heat exchanger 15 reduces under the frost delay control. Therefore, it is possible to delay the frost formation on the exterior heat exchanger 15 while maintaining as much comfort of the occupant by the air conditioning as possible.

In the present embodiment, as described in S405, the controller 40 sets the opening degree of the first expansion valve 14 so that the subcooling degree of the refrigerant flowing into the first expansion valve 14 approaches the target subcooling degree under the frost delay control. The target subcooling degree is set so that the coefficient of performance COP of the cycle approaches the maximum value.

In this way, it is possible to bring the subcooling degree of the refrigerant close to the target subcooling degree, even if the refrigerant pressure on the high-pressure side is increased under the frost delay control. Therefore, it is possible to delay the frost formation on the exterior heat exchanger 15 while minimizing reduction of the coefficient of performance COP of the cycle.

Second Embodiment

Figure 10:
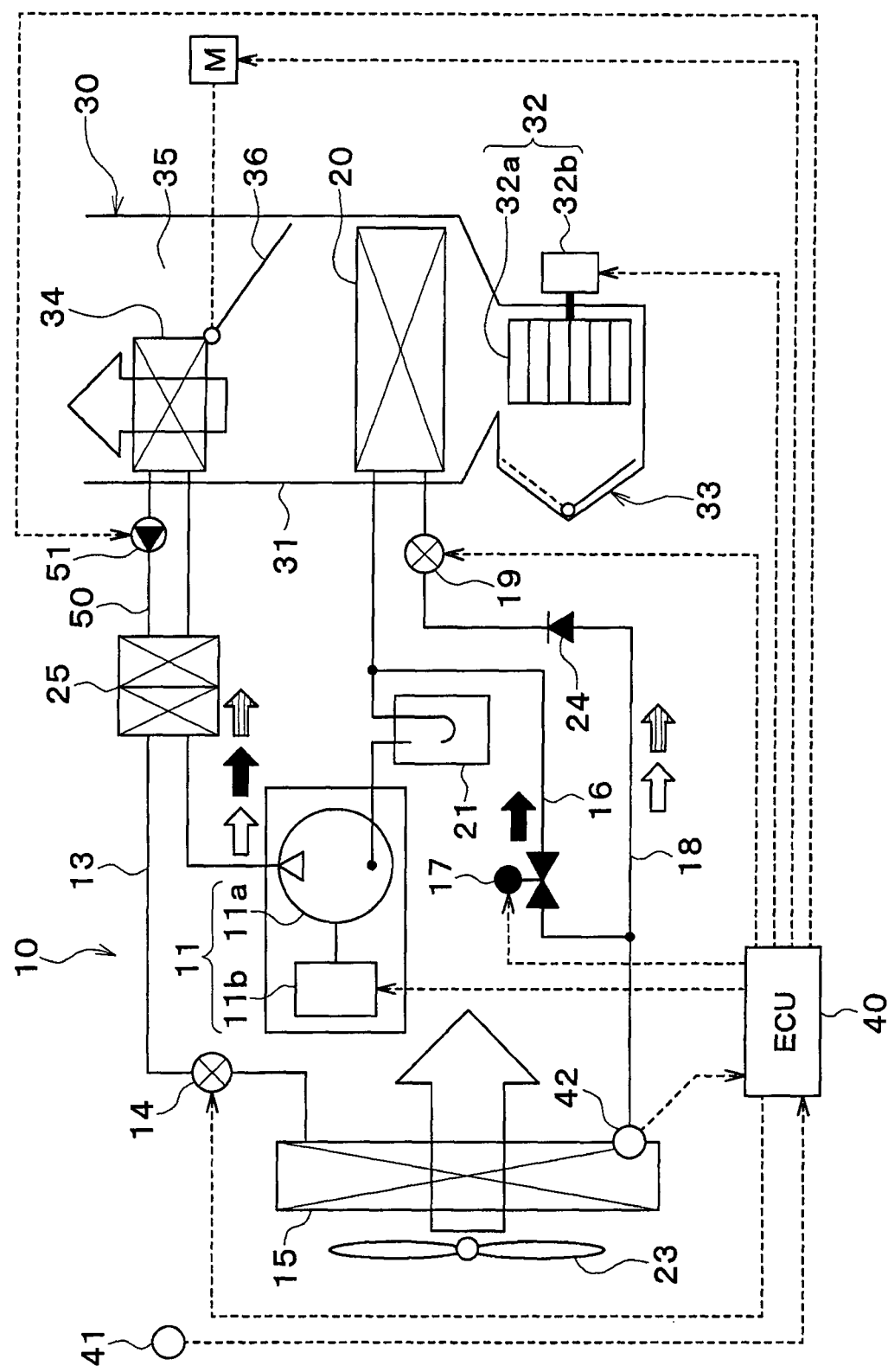
FIG. 10 is a diagram illustrating a whole configuration of an air conditioning device for a vehicle according to a second embodiment.

In the first embodiment, the high-pressure refrigerant discharged from the compressor 11 dissipates heat into the air in the interior condenser 12. In the present embodiment, as shown in FIG. 10, high-pressure refrigerant discharged from a compressor 11 dissipates heat into heat medium in a refrigerant-heat medium heat exchanger 25 and the heat medium to which the heat is dissipated in the refrigerant-heat medium heat exchanger 25 dissipates heat into air in a heater core 34. For example, the heat medium is ethylene glycol antifreeze which is what is called LLC.

The refrigerant-heat medium heat exchanger 25 and the heater core 34 are radiators that dissipate heat of the refrigerant discharged from the compressor 11, thereby heating the air by utilizing the heat dissipated from the refrigerant. The heater core 34 is a heat medium-air heat exchanger that performs heat exchange between the heat medium and the air.

The heater core 34 is housed in a case 31 of the interior air conditioning unit 30 in place of the interior condenser 12 in the first embodiment. The heater core 34 is disposed on a downstream side of the interior evaporator 20 in an air flow direction.

The cold air bypass passage 35 allows the air passing through the interior evaporator 20 to flow while detouring around the heater core 34. The air mix door 36 adjusts a ratio between a volume of air passing through the heater core 34 and a volume of air passing through the cold air bypass passage 35.

The heater core 34 is a heating heat exchanger that performs heat exchange between the heat medium circulating through a heat medium circuit 50 and the air. A pump 51 that draws and discharges the heat medium is disposed in the heat medium circuit 50. Operation of the pump 51 is controlled by the controller 40.

In a normal heating mode, a control signal output to a servomotor of the air mix door 36 is set in the same way as in the first embodiment so that the air mix door 36 closes the cold air bypass passage 35 and that an entire volume of the air after passing through the interior evaporator 20 passes through an air passage in the heater core 34. In the normal heating mode, the air mix door 36 is operated into a position for a maximum heating state.

In a frost formation delaying mode, a control signal output to the servomotor of the air mix door 36 is set in the same way as in the first embodiment so that the air mix door 36 opens the cold air bypass passage 35 to a specified degree and that the air after passing though the interior evaporator 20 divides into the air passage in the heater core 34 and the cold air bypass passage 35. In the frost formation delaying mode, the opening degree of the air mix door 36 is set to be smaller than 100%.

In this way, efficiency of the refrigerant-heat medium heat exchanger 25 reduces and high pressure in a cycle increases. As a result, similar effects to those in the first embodiment can be exerted.

Third Embodiment

Figure 11:
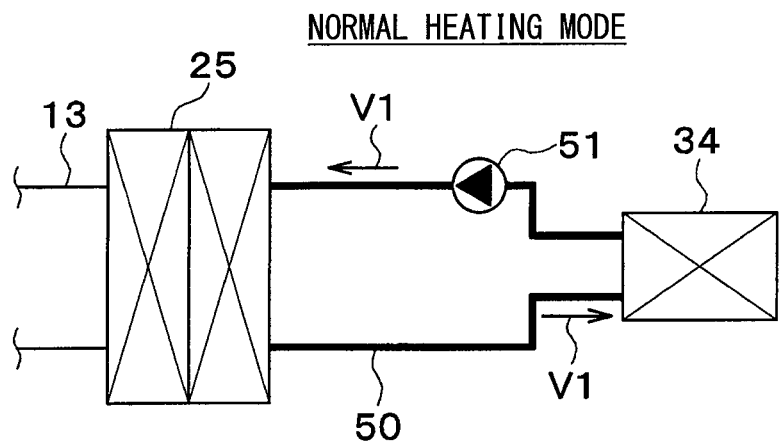
FIG. 11 is a schematic diagram illustrating an operation state of a heat medium circuit in a normal heating mode in an air conditioning device for a vehicle according to a third embodiment.
Figure 12:
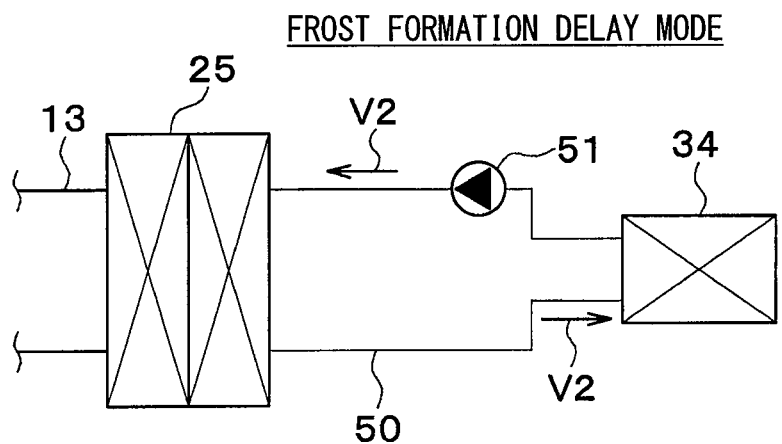
FIG. 12 is a schematic diagram illustrating an operation state of the heat medium circuit in a frost formation delaying mode in the air conditioning device for the vehicle according to the third embodiment.

In the second embodiment, the air mix door 36 reduces the volume of the air passing through the heater core 34 to thereby delay the frost formation on the exterior heat exchanger 15 in the frost formation delaying mode. In the present embodiment, as show in in FIGS. 11 and 12, a volume of heat medium discharged from the pump 51 is reduced to thereby delay frost formation on the exterior heat exchanger 15 in a frost formation delaying mode.

In the frost formation delaying mode, the controller 40 sets a control signal output to the pump 51 so that a volume V2 of the heat medium discharged from the pump 51 becomes smaller than a volume V1 of the heat medium discharged from the pump 51 in a normal heating mode. The volume V2 of the heat medium discharged by the pump 51 in the frost formation delaying mode is smaller than the volume V1 of the heat medium discharged by the pump in the normal heating mode.

In this way, the volume of the heat medium flowing through the refrigerant-heat medium heat exchanger 25 reduces, efficiency of the refrigerant-heat medium heat exchanger 25 reduces, and high pressure in a cycle increases. As a result, similar effects to those in the second embodiment can be exerted.

In the present embodiment, the controller 40 reduces the volume of the heat medium discharged from the pump 51 under a frost delay control.

In this way, it is possible to increase refrigerant pressure on a high-pressure side by reducing the volume of the heat medium flowing through the refrigerant-heat medium heat exchanger 25 under the frost delay control. As a result, it is possible to delay the frost formation on the exterior heat exchanger 15.

Fourth Embodiment

In the third embodiment, the volume of the heat medium discharged from the pump 51 is reduced to thereby delay the frost formation on the exterior heat exchanger 15 in the frost formation delaying mode. In the present embodiment, as shown in FIGS. 13 and 14, heat medium flows while bypassing the refrigerant-heat medium heat exchanger 25 and thereby delaying frost formation on the exterior heat exchanger 15 in a frost formation delaying mode.

The heat medium circuit 50 has a bypass path 52 and a bypass switching valve 53. The bypass path 52 is a flow path in which the heat medium flows while bypassing the refrigerant-heat medium heat exchanger 25. The bypass switching valve 53 is an adjuster that adjusts opening of the bypass path 52 to thereby adjust a volume of the heat medium flowing through the bypass path 52. Operation of the bypass switching valve 53 is controlled by the controller 40.

Figure 13:
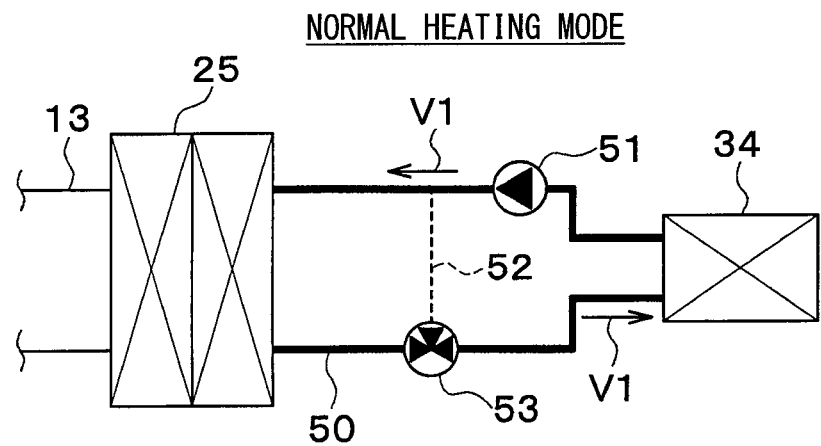
FIG. 13 is a schematic diagram illustrating an operation state of a heat medium circuit in a normal heating mode in an air conditioning device for a vehicle according to a fourth embodiment.

In a normal heating mode, the controller 40 sets a control signal output to the bypass switching valve 53 so that the bypass path 52 is closed and that an entire volume of the heat medium discharged from the pump 51 passes through the refrigerant-heat medium heat exchanger 25 as shown in FIG. 13.

Figure 14:
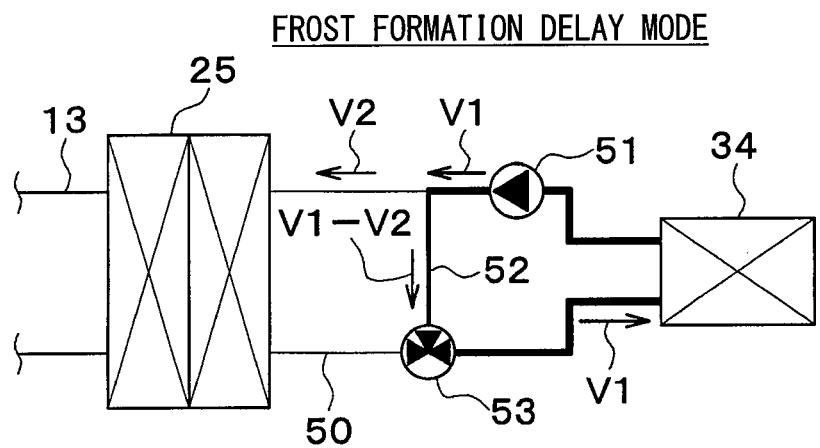
FIG. 14 is a schematic diagram illustrating an operation state of the heat medium circuit in a frost formation delaying mode in the air conditioning device for the vehicle according to the fourth embodiment.

In frost formation delaying mode, the controller 40 sets a control signal output to the bypass switching valve 53 so that the bypass path 52 is opened and that the heat medium discharged from the pump 51 divides into the refrigerant-heat medium heat exchanger 25 and the bypass path 52 as shown in FIG. 14.

In this way, the volume of the heat medium flowing through the refrigerant-heat medium heat exchanger 25 reduces, efficiency of the refrigerant-heat medium heat exchanger 25 reduces, and high pressure in a cycle increases. As a result, similar effects to those in the second embodiment can be exerted.

In the frost formation delaying mode, since the volume of the heat medium flowing through the heater core 34 is the same as that in the normal heating mode, it is possible to suppress unevenness of a temperature of air blown out of the heater core 34.

In the present embodiment, the controller 40 controls the operation of the volume adjuster 53 so that the volume of the heat medium flowing through the bypass path 52 increases while maintaining the volume of the heat medium discharged from the pump 51 under the frost delay control.

In this way, by reducing the volume of the heat medium flowing through the refrigerant-heat medium heat exchanger 25, it is possible to increase the refrigerant pressure on the high-pressure side under the frost delay control. At this time, since the volume of the heat medium flowing through the refrigerant-heat medium heat exchanger 25 is reduced by utilizing the bypass path 52, it is possible to maintain the volume of the heat medium flowing through the heater core 34. As a result, it is possible to delay the frost formation on the exterior heat exchanger 15 while suppressing the unevenness of the temperature of the air blown out of the heater core 34.

Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure has all modifications that are equivalent to descriptions of the present disclosure or that are made within the scope of the present disclosure.

(1) Although the operation mode is switched among the heating mode, the cooling mode, and the dehumidification heating mode by use of the operation signal from the air conditioning switch in the example described in each of the above-described embodiments, the present invention is not limited to the embodiments. For example, operation mode setting switches that sets respective operation modes may be provided to an operation panel and the operation mode may be switched among the heating mode, the cooling mode, and the dehumidification heating mode in response to operation signals from the operation mode setting switches.

(2) Although the air conditioning device 1 for the vehicle is mounted to the hybrid vehicle in each of the above-described embodiments, the present invention is not limited to the embodiments and the air conditioning device 1 for the vehicle may be mounted to various vehicles such as electric vehicles.

What is claimed is:

1. An air conditioning device for a vehicle, comprising:
a blower that blows air toward an inside of a vehicle compartment;
a compressor that compresses and discharges a refrigerant;
a radiator that dissipates a heat of the refrigerant, which is discharged from the compressor, to the air thereby heating the air;
a decompressor that decompresses the refrigerant after the heat of the refrigerant is dissipated in the radiator;
a heat absorber in which the refrigerant decompressed in the decompressor absorbs heat from outside air, the compressor, the radiator, the decompressor, and the heat absorber forming a refrigerant cycle;
a heat medium circuit in which a heat medium circulates;
a pump that draws and discharges the heat medium; and
a controller that determines whether the heat absorber is in a frosted state in which a frost is formed on the heat absorber or whether the heat absorber is in an estimated frosted state in which a frost is possibly formed on the heat absorber, the controller that performs a frost delay control, in which the controller controls an operation of the pump to reduce a volume of the heat medium from the pump in the frost delay control to raise a pressure of the refrigerant on a high-pressure side of the refrigerant cycle, thereby delaying a formation of the frost when the controller determines that the heat absorber is in the frosted state or the estimated frosted state;
wherein
the radiator has
a refrigerant-heat medium heat exchanger that dissipates a heat of the refrigerant, which is discharged from the compressor, to the heat medium and
a heat medium-air heat exchanger that performs a heat exchange between the heat medium and the air.

2. The air conditioning device for a vehicle according to claim 1, further comprising
an air mix door that adjusts a ratio between a volume of the air, which is blown by the blower and heated in the radiator, and a volume of a rest of the air blown by the blower, wherein
the controller controls an operation of the air mix door to reduce the volume of the air heated in the radiator in the frost delay control.

3. The air conditioning device for a vehicle according to claim 1, wherein
the controller, in the frost delay control, increases a rotational speed of the compressor to a specified rotational speed that is set relative to a target blowing temperature.

4. The air conditioning device for the vehicle according to claim 1, wherein
the controller sets an opening degree of the decompressor so as to bring a subcooling degree of the refrigerant flowing into the decompressor closer to a target subcooling degree in the frost delay control, the target subcooling degree being set to bring a coefficient of performance of a cycle closer to a maximum value.

5. The air conditioning device for a vehicle according to claim 1, wherein the controller, in the frost delay control, raises the pressure of the refrigerant on the high-pressure side of the refrigerant cycle by controlling the operation of the pump to reduce the volume of the heat medium from the pump and by controlling an air mix door to reduce a volume of the air heated in the radiator.

6. An air conditioning device for a vehicle comprising:
a blower that blows air toward an inside of a vehicle compartment;
a compressor that compresses and discharges a refrigerant;
a radiator that dissipates a heat of the refrigerant, which is discharged from the compressor, to the air thereby heating the air;
a decompressor that decompresses the refrigerant after the heat of the refrigerant is dissipated in the radiator;
a heat absorber in which the refrigerant decompressed in the decompressor absorbs heat from outside air, the compressor, the radiator, the decompressor, and the heat absorber forming a refrigerant cycle;
a controller that determines whether the heat absorber is in a frosted state in which a frost is formed on the heat absorber or whether the heat absorber is in an estimated frosted state in which a frost is possibly formed on the heat absorber, the controller that performs a frost delay control, thereby delaying a formation of the frost when the controller determines that the heat absorber is in the frosted state or the estimated frosted state;
a heat medium circuit in which a heat medium circulates; and
a pump that draws and discharges the heat medium, wherein
the radiator has
a refrigerant-heat medium heat exchanger that dissipates a heat of the refrigerant, which is discharged from the compressor, to the heat medium and
a heat medium-air heat exchanger that performs heat exchange between the heat medium and the air,
the heat medium circuit has
a bypass path in which the heat medium flows while bypassing the refrigerant-heat medium heat exchanger and
a volume adjuster that adjusts a volume of the heat medium flowing through the bypass path, and
the controller, in the frost delay control, controls an operation of the volume adjuster to increase the volume of the heat medium flowing through the bypass path while maintaining a volume of the heat medium discharged from the pump to increase a pressure of the refrigerant on a high-pressure side of the refrigerant cycle.

7. The air conditioning device for a vehicle according to claim 6, further comprising
an air mix door that adjusts a ratio between a volume of the air, which is blown by the blower and heated in the radiator, and a volume of a rest of the air blown by the blower, wherein
the controller controls an operation of the air mix door to reduce the volume of the air heated in the radiator in the frost delay control.

8. The air conditioning device for a vehicle according to claim 6, wherein
the controller, in the frost delay control, increases a rotational speed of the compressor to a specified rotational speed that is set relative to a target blowing temperature.

9. The air conditioning device for the vehicle according to claim 6, wherein
the controller sets an opening degree of the decompressor so as to bring a subcooling degree of the refrigerant flowing into the decompressor closer to a target subcooling degree in the frost delay control, the target subcooling degree being set to bring a coefficient of performance of a cycle closer to a maximum value.

10. The air conditioning device for the vehicle according to claim 6, wherein the volume adjuster is an air mix door and the controller, in the frost delay control, raises the pressure of the refrigerant on the high-pressure side of the refrigerant cycle by controlling the operation the air mix door to increase the volume of the heat medium flowing through the bypass path and reduce a volume of the air heated in the radiator while controlling the operation of the pump to maintain the volume of the heat medium discharged from the pump.

* * * * *